United States Patent
Rockwood

(10) Patent No.: US 8,572,733 B1
(45) Date of Patent: Oct. 29, 2013

(54) SYSTEM AND METHOD FOR ACTIVE DATA COLLECTION IN A NETWORK SECURITY SYSTEM

(75) Inventor: Troy Dean Rockwood, Thousand Oaks, CA (US)

(73) Assignee: Raytheon Company, Waltham, MA (US)

( * ) Notice: Subject to any disclaimer, the term of this patent is extended or adjusted under 35 U.S.C. 154(b) by 1299 days.

(21) Appl. No.: 11/176,436

(22) Filed: Jul. 6, 2005

(51) Int. Cl.
 *H04L 29/06* (2006.01)

(52) U.S. Cl.
 USPC ............................ 726/23; 726/25; 709/224

(58) Field of Classification Search
 USPC .................... 726/22, 23, 25; 709/223, 224
 See application file for complete search history.

(56) References Cited

U.S. PATENT DOCUMENTS

| | | | |
|---|---|---|---|
| 5,020,411 A | 6/1991 | Rowan | 89/1.11 |
| 5,341,229 A | 8/1994 | Rowan | 359/10 |
| 5,432,871 A | 7/1995 | Novik | 382/232 |
| 5,790,599 A | 8/1998 | Wright, Jr. et al. | |
| 5,805,801 A | 9/1998 | Holloway et al. | 395/187.01 |
| 5,991,881 A | 11/1999 | Conklin et al. | 726/22 |
| 6,226,589 B1 | 5/2001 | Maeda et al. | 701/207 |
| 6,253,337 B1 * | 6/2001 | Maloney et al. | 714/38 |
| 6,327,550 B1 | 12/2001 | Vinberg et al. | 702/186 |
| 6,341,298 B1 | 1/2002 | Ilani | |
| 6,347,263 B1 | 2/2002 | Johnson et al. | 701/14 |
| 6,404,380 B2 | 6/2002 | Poore, Jr. | 342/96 |
| 6,408,297 B1 * | 6/2002 | Ohashi | 707/10 |
| 6,421,467 B1 | 7/2002 | Mitra | |
| 6,574,378 B1 | 6/2003 | Lim | |
| 6,633,882 B1 | 10/2003 | Fayyad et al. | |
| 6,650,779 B2 | 11/2003 | Vachtesvanos et al. | |
| 6,665,715 B1 * | 12/2003 | Houri | 709/223 |
| 6,674,911 B1 | 1/2004 | Pearlman et al. | |
| 6,744,396 B2 | 6/2004 | Stone et al. | 342/36 |
| 6,907,430 B2 * | 6/2005 | Chong et al. | 1/1 |
| 6,954,775 B1 | 10/2005 | Shanklin et al. | 718/105 |
| 7,017,186 B2 | 3/2006 | Day | |
| 7,058,976 B1 | 6/2006 | Dark | 726/23 |
| 7,100,204 B1 * | 8/2006 | Myllymaki et al. | 726/22 |
| 7,127,743 B1 | 10/2006 | Khanolkar et al. | 726/23 |
| 7,130,611 B2 | 10/2006 | Kimura et al. | 455/404.2 |
| 7,146,421 B2 | 12/2006 | Syvanne | 709/226 |
| 7,185,368 B2 | 2/2007 | Copeland, III | 726/25 |
| 7,251,376 B2 | 7/2007 | Qian et al. | |

(Continued)

OTHER PUBLICATIONS

Sheng Ma, et al.; *Event Miner: An Integrated Mining Tool for Scalable Analysis of Event Data*; 17 pages, May 21, 2001.

(Continued)

*Primary Examiner* — Joseph P. Hirl
*Assistant Examiner* — John B King
(74) *Attorney, Agent, or Firm* — Schwegman, Lundberg & Woessner, P.A.

(57) ABSTRACT

A network security system comprises a plurality of sensors, a management server, and a data collection module. The plurality of sensors receive first data associated with potential attacks on the system. The manager server is coupled to at least one sensor and correlates at least a portion of the first data to detect potential attacks on the system. The data collection module is coupled to the manager server and generates at least one request for second data based upon at least one of the first data and the correlated data. The data collection module communicates the request to at least one source different from the plurality of sensors.

20 Claims, 2 Drawing Sheets

(56) References Cited

U.S. PATENT DOCUMENTS

| | | | |
|---|---|---|---|
| 7,324,108 B2 | 1/2008 | Hild et al. | 345/440 |
| 7,370,358 B2 | 5/2008 | Ghanea-Hercock | 726/23 |
| 2002/0016831 A1* | 2/2002 | Peled et al. | 709/219 |
| 2002/0059164 A1 | 5/2002 | Shtivelman | 707/1 |
| 2002/0066034 A1* | 5/2002 | Schlossberg et al. | 713/201 |
| 2002/0078381 A1 | 6/2002 | Farley et al. | 713/201 |
| 2002/0112189 A1 | 8/2002 | Syvanne et al. | 713/201 |
| 2002/0165842 A1 | 11/2002 | Hellerstein et al. | 706/47 |
| 2003/0009699 A1 | 1/2003 | Gupta et al. | 713/201 |
| 2003/0023876 A1* | 1/2003 | Bardsley et al. | 713/201 |
| 2003/0058339 A1 | 3/2003 | Trajkovic et al. | 348/155 |
| 2003/0084349 A1* | 5/2003 | Friedrichs et al. | 713/201 |
| 2003/0105976 A1 | 6/2003 | Copeland, III | 713/201 |
| 2003/0145226 A1 | 7/2003 | Bruton et al. | 726/22 |
| 2003/0154399 A1 | 8/2003 | Zuk et al. | 726/11 |
| 2003/0177383 A1 | 9/2003 | Ofek et al. | 726/14 |
| 2003/0188189 A1* | 10/2003 | Desai et al. | 713/201 |
| 2003/0200236 A1 | 10/2003 | Hong | |
| 2003/0217289 A1 | 11/2003 | Ammon et al. | 713/201 |
| 2004/0015719 A1 | 1/2004 | Lee et al. | 726/23 |
| 2004/0024855 A1 | 2/2004 | Tsai et al. | 709/223 |
| 2004/0025044 A1 | 2/2004 | Day | |
| 2004/0044912 A1* | 3/2004 | Connary et al. | 713/201 |
| 2004/0049698 A1* | 3/2004 | Ott et al. | 713/201 |
| 2004/0098623 A1* | 5/2004 | Scheidell | 713/201 |
| 2004/0103211 A1 | 5/2004 | Jackson et al. | 709/244 |
| 2004/0107125 A1 | 6/2004 | Guheen et al. | 705/7 |
| 2004/0117407 A1 | 6/2004 | Kumar et al. | 707/200 |
| 2004/0117654 A1* | 6/2004 | Feldman et al. | 713/201 |
| 2004/0133543 A1 | 7/2004 | Shlaes et al. | 707/1 |
| 2004/0172557 A1 | 9/2004 | Nakae et al. | 726/22 |
| 2004/0193943 A1 | 9/2004 | Angelino et al. | 714/4 |
| 2004/0215977 A1* | 10/2004 | Goodman et al. | 713/201 |
| 2004/0260945 A1* | 12/2004 | Raikar et al. | 713/201 |
| 2004/0261116 A1 | 12/2004 | Mckeown et al. | 725/109 |
| 2004/0267886 A1* | 12/2004 | Malik | 709/206 |
| 2005/0044406 A1 | 2/2005 | Stute | 713/201 |
| 2005/0047670 A1 | 3/2005 | Qian et al. | |
| 2005/0108518 A1 | 5/2005 | Pandya | 713/151 |
| 2005/0138110 A1 | 6/2005 | Redlich et al. | 709/201 |
| 2005/0210532 A1* | 9/2005 | Winick | 726/22 |
| 2005/0222996 A1 | 10/2005 | Yalamanchi | 707/4 |
| 2005/0254654 A1 | 11/2005 | Rockwell et al. | 380/270 |
| 2006/0010493 A1 | 1/2006 | Piesco et al. | 726/23 |
| 2006/0031934 A1* | 2/2006 | Kriegel | 726/22 |
| 2006/0037075 A1* | 2/2006 | Frattura et al. | 726/22 |
| 2006/0123478 A1* | 6/2006 | Rehfuss et al. | 726/22 |
| 2006/0130070 A1 | 6/2006 | Graf | 719/318 |
| 2006/0156401 A1* | 7/2006 | Newstadt et al. | 726/22 |
| 2006/0209836 A1 | 9/2006 | Ke et al. | 370/342 |
| 2006/0253905 A1* | 11/2006 | Mansel | 726/23 |
| 2006/0253907 A1* | 11/2006 | McConnell | 726/23 |
| 2007/0009160 A1 | 1/2007 | Loo et al. | |
| 2007/0107053 A1* | 5/2007 | Shraim et al. | 726/22 |

OTHER PUBLICATIONS

Gersho et al., "Vector Quantization and Signal Compression," Kluwar Academic Publishers, 737 pages, 1992.

Patent Pending U.S. Appl. No. 10/407,513, entitled "*Vertically Extensible Intrusion Detection System and Method*", inventors Jon-Michael C. Brook, et al., 44 pages plus 7 pages of drawings, filed Apr. 4, 2003.

Patent Pending U.S. Appl. No. 10/407,700, entitled "*Dynamic Rule Generation for an Enterprise Intrusion Detection System*", inventors Jon-Michael C. Brook, et al., 38 pages plus 7 pages of drawings, filed Apr. 4, 2003.

Patent Pending U.S. Appl. No. 10/407,030, entitled "*Graphical User Interface for an Enterprise Intrusion Detection System*", inventors Jon-Michael C. Brook, et al., 34 pages plus 7 pages of drawings, filed Apr. 4, 2003.

New Patent Application (serial no. not yet assigned), entitled "*System and Method for Collaborative Information Security Correlation in Low Bandwidth Environments*", inventor Troy D Rockwood, 44 pages plus 7 pages of drawings, Filing date Sep. 1, 2005.

New Patent Application (serial no. not yet assigned), entitled "*System and Method for Interactive Correlation Rule Design in a Network Security System*", inventor Troy D. Rockwood, 31 pages plus 4 pages of drawings, Filing date Sep. 1, 2005.

New Patent Application (serial no. not yet assigned), entitled "*System and Method for Intruder Tracking Using Advanced Correlation in a Network Security System*", inventor Troy D. Rockwood, 43 pages plus 7 pages of drawings, Filing date Sep. 1, 2005.

Henry S. Teng, et al.; *Security Audit Trail Analysis Using Inductively Generated Predictive Rules*; IEEE; CH2842-3/90/0000/0024; pp. 24-29, 1990.

IEEE Xplore Release 2.5 Search Results; 4 pages, retrieved Jan. 6, 2009.

USPTO; Office Action for U.S. Appl. No. 11/219,025, filed Sep. 1, 2005 in the name of Troy Dean Rockwood; 16 pages, Jan. 15, 2009.

N. Hari Narayanan, et al.; *A Methodology for Knowledge Acquisition and Reasoning in Failure Analysis of Systems*; IEEE Transactions on Systems, Man, and Cybernetics; vol. SMC-17, No. 2; pp. 274-288, 1987.

Henry S. Vaccaro; *Detection of Anomalous Computer Session Activity*; IEEE Symposium on Research in Security and Privacy; 24 pages, May 1989.

Henry S. Teng, et al.; *Adaptive Real-Time Anomaly Detection Using Inductively Generated Sequential Patterns*; IEEE; CH2884-5/90/0000/0278; pp. 278-284, 1990.

Keith C. C. Chan, et al.; *Learning Sequential Patterns for Probabilistic Inductive Prediction*; IEEE Transactions on Systems, Man, and Cybernetics; vol. 24, No. 10; 16 pages, Oct. 1994.

F. Girault, et al.; *Linear Logic as a Tool for Reasoning on a Petri Net Model*; IEEE Symposium on Emerging Technologies and Factory Automation; 11 pages, Oct. 1995.

P. Nassery, et al.; *Real Time Seismic Signal Processing Using the ARMA Model Coefficients and an Intelligent Monitoring System*; IEEE TENCON—Speech and Image Technologies for Computing and Telecommunications; pp. 807-810, 1997.

Moataz A. Ahmed, et al.; *Rule-Based Information Distribution Systems: Near-Optimal Rule Sets Generation*; IEEE; 0-7803-4778-1; pp. 1564-1569, 1998.

P. Lang, et al.; *Graphical Editor for the Conceptual Design of Business Rules*; 1 page, Feb. 1998.

Alistair G. Sutcliffe, et al.; *Supporting Scenario-Based Requirements Engineering*; IEEE Transactions on Software Engineering; vol. 24, No. 12; pp. 1072-1088, Dec. 1998.

Adrian K. Rantilla, et al.; *Aggregation of Expert Opinions*; Proceedings of the 32nd Hawaii International Conference on System Sciences; IEEE 0-7695-0001-3/99; pp. 1-11, 1999.

Slavica Jonic, et al.; *Three Machine Learning Techniques for Automatic Determination of Rules to Control Locomotion*; IEEE Transactions on Biomedical Engineering; vol. 46, No. 3; pp. 300-310, Mar. 1999.

Ian Ho, et al.; *Generating Test Cases for Real-Time Software by Time Petri Nets Model*; Proceedings Eighth Asian Test Symposium; 7 pages, Nov. 1999.

Virtyt Koshi; *Radio Network Planning for Ultra TDD Systems*; First International Conference on 3G Mobile Communication Technologies; 7 pages, Mar. 2000.

Ilham Benyahia, et al.; *An Adaptive Framework for Distributed Complex Applications Development*; Proceedings 34th International Conference on Technology of Object-Oriented Languages and Systems; 12 pages, Jul. 2000.

Tae-Sic Yoo, et al.; *New Results on Decentralized Supervisory Control of Discrete-Event Systems*; 6 pages, Dec. 2000.

Ping-Peng Yuan, et al.; *An Event and Service Interacting Model and Event Detection Based on the Broker/Service Mode*; pp. 20-24, Jul. 2001.

W. E. Brown, et al.; *Estimation of Ocean Bottom Scattering Strength Using Discrete Eigenray Matching in Shallow Water*; MTS 0-933-957-28-9; pp. 1636-1639, Nov. 2001.

XiaoShu Hang, et al.; *A FSA-Based Approach for Mining Sequential Patterns with User-Specified Skeletons*; Proceedings of the 4th World Congress on Intelligent Control and Automation; 6 pages, Jun. 2002.

(56) References Cited

OTHER PUBLICATIONS

Azizi Ab Aziz, et al.; *Development of an Adaptive Business Insolvency Classifier Prototype (AVICENA) Using Hybrid Intelligent Algorithms*; Proceedings Globalizing Research and Development in Electrical and Electronics Engineering; 5 pages, Jul. 2002.
Loganathan Lingappan, et al.; *Test Generation for Non-Separable RTL Controller-Datapath Circuits Using a Satisfiability Based Approach*; Proceedings of the 21st International Conference on Computer Design; 7 pages, 2003.
F. Y. Nakamoto, et al.; *Systematization of the Project of the Production System Control*; IEEE International Symposium on Industrial Electronics; 8 pages, Jun. 2003.
Nicholas Pioch, et al.; *CADRE: Continuous Analysis and Discovery From Relational Evidence*; International Conference on Integration of Knowledge Intensive Multi-Agent Systems; 9 pages, Sep. 2003.
Andrew Hamilton-Wright, et al.; *Constructing a Fuzzy Rule Based Classification System Using Pattern Discovery*; NAFIPS 2005—2005 Annual Meeting of the North American Fuzzy Information Processing Society; pp. 460-465, 2005.
Patent Pending U.S. Appl. No. 11/219,595 entitled *System and Method for Intruder Tracking Using Advanced Correlation in a Network Security System* in the name of Troy D. Rockwood; 50 total pages, filed Sep. 1, 2005.
USPTO; Office Action for U.S. Appl. No. 10/407,700, filed Apr. 4, 2003 in the name of Jon-Michael C. Brook; 10 pages, Aug. 9, 2006.
USPTO; Office Action for U.S. Appl. No. 10/407,030, filed Apr. 4, 2003 in the name of Jon-Michael C. Brook; 9 pages, Jan. 8, 2007.
USPTO; Office Action for U.S. Appl. No. 10/407,513, filed Apr. 4, 2003 in the name of Jon-Michael C. Brook; 12 pages, Mar. 27, 2007.
USPTO; Office Action for U.S. Appl. No. 10/407,700, filed Apr. 4, 2003 in the name of Jon-Michael C. Brook; 9 pages, Apr. 19, 2007.
USPTO; Office Action for U.S. Appl. No. 11/219,595, filed Sep. 1, 2005 in the name of Troy Dean Rockwood; 17 pages, Jun. 7, 2007.
USPTO; Advisory Action for U.S. Appl. No. 10/407,700, filed Apr. 4, 2003 in the name of Jon-Michael C. Brook; 3 pages, Jul. 6, 2007.
USPTO; Notice of Allowance and Fee(s) Due for U.S. Appl. No. 10/407,030, filed Apr. 4, 2003 in the name of Jon-Michael C. Brook; 15 pages, Aug. 24, 2007.
USPTO; Notice of Allowance and Fee(s) Due for U.S. Appl. No. 10/407,513, filed Apr. 4, 2003 in the name of Jon-Michael C. Brook; 17 pages, Nov. 6, 2007.
USPTO; Notice of Allowance and Fee(s) Due for U.S. Appl. No. 11/219,595, filed Sep. 1, 2005 in the name of Troy Dean Rockwood; 6 pages, Nov. 7, 2007.
USPTO; Office Action for U.S. Appl. No. 11/219,025, filed Sep. 1, 2005 in the name of Troy Dean Rockwood; 11 pages, Mar. 24, 2008.
USPTO; Office Action for U.S. Appl. No. 11/219,025, filed Sep. 1, 2005 in the name of Troy Dean Rockwood; 12 pages, Sep. 10, 2008.
USPTO; Advisory Action for U.S. Appl. No. 11/219,025, filed Sep. 1, 2005 in the name of Troy Dean Rockwood; 3 pages, Nov. 20, 2008.
USPTO; Office Action for U.S. Appl. No. 11/219,291, filed Sep. 1, 2005 in the name of Troy Dean Rockwood; 33 pages, Dec. 11, 2008.
USPTO; Office Action for U.S. Appl. No. 10/407,700, filed Apr. 4, 2003 in the name of Jon-Michael C. Brook; 7 pages, Apr. 17, 2009.
USPTO; Office Action for U.S. Appl. No. 11/219,291, filed Sep. 1, 2005 in the name of Troy Dean Rockwood; 36 pages, May 20, 2009.
Peng Ning, et al.; *Techniques and Tools for Analyzing Intrusion Alerts*; ACM Transactions on Information and System Security; vol. 7, No. 2; 45 pages, May 2004.
Patent Pending U.S. Appl. No. 11/328,689 entitled *System and Method for Attacker Attribution in a Network Security System* in the name of Troy Dean Rockwood; 51 total pages, filed Jan. 10, 2006.
USPTO; Office Action for U.S. Appl. No. 11/328,689, filed Jan. 10, 2006 in the name of Troy Dean Rockwood; 18 pages, Mar. 19, 2009.
USPTO; Office Action for U.S. Appl. No. 11/219,025, filed Sep. 1, 2005 in the name of Troy Dean Rockwood; 12 pages, Jul. 22, 2009.
Qin Jiang, USPTO, Office Action for U.S. Appl. No. 11/559,786, filed Nov. 14, 2006, mailed Aug. 10, 2009.
Troy Dean, USPTO, Office Action for U.S. Appl. No. 11/328,689, filed Jan. 10, 2006, mailed Sep. 10, 2009.
Li et al., "Multi-Tier Intrusion Detection System," pp. 1-11, 2001.
Commonwealth of Australia, "Handbook 13, Intrusion Detection and Audit Analysis, v. 1.0," Australian Communications-Electronic Security Instruction 33 (ACSI 33), pp. 13:1-13, 2000.
Wu et al., "JiNao: Design and Implementation of a Scalable Intrusion Detection System for the OSPF Routing Protocol," pp. 0-23, Feb. 24, 1999.
Dasgupta; "Experiments with Random Projection," Proc. 16th Conference Uncertainty in Artificial Intelligence (UAI), 9 pages, 2000.
Cisco Systems, Inc., "NetRanger User Guide 2.2.1," Chapters 1-9 and Appendices A-C, 2000.
Jou et al., "Design and Implementation of a Scalable Intrusion Detection System for the Protection of Network Infrastructure," DARPA Information Survivability Conference and Exposition (DISCEX), 15 pages, Jan. 2000.
Boeckman, "Getting Closer to Policy-Based Intrusion Detection," Information Security Bulletin, pp. 13-20, May 2000.
Jansen et al., "Mobile Agents in Intrusion Detection and Response," National Institute for Standards and Technology, 12 pages, Jun. 2000.
Northcutt et al., "Network Intrusion Detection: An Analyst's Handbook," $2^{nd}$ Ed., 19 pages, Sep. 2000.
Phung, "Intrusion Detection FAQ; Data Mining in Intrusion Detection," SANS.org, 3 pages, Oct. 24, 2000.
Power, "CSI Roundtable: Experts Discuss Present and Future Intrusion Detection Systems," Computer Security Journal vol. XIV, #1, 15 pages, 2001.
Bace et al., "Intrusion Detection Systems," NIST Special Publication on Intrusion Detection System, 51 pages, Feb. 2001.
"Stick—A Potential Denial of Service Against IDS Systems," Internet Security Systems Security Alert, 2 pages, Mar. 14, 2001.
Arnold, "Kernel Based Anomaly Detection," Intrusion Detection Systems, Machine Learning Group, Columbia University, 2 pages, Apr. 26, 2001.
Wang et al., "SITAR: A Scalable Intrusion-Tolerant Architecture for Distributed Services," IEEE Workshop on Information Assurance and Security, pp. 38-45, Jun. 5-6, 2001.
Intrusion.com, Inc., "Network Intrusion Detection System," SecureNet Series, 6 pages, Jul. 2001.
Raghudharan, "Intrusion Detection Systems: Beyond the first line of defense," Network Magazine, 7 pages, Sep. 2001.
Yocom et al., "Intrusion Detection Products Grow Up," Network World, pp. 1-10/12, Oct. 8, 2001.
Symantec, "Symantec™ ManHunt: Reducing the Risk of Compromise," Enterprise Security Technology, 4 pages, 2002.
ISS Corporation, "ISS RealSecure © Protection System," 5 pages, Apr. 1, 2003.
Curry et al., "Intrusion Detection Message Exchange Format Data Model and Extensible Markup Language (XML) Document Type Definition," Intrusion Detection Working Group, 116 pages, Jan. 30, 2003.
Jiang et al., "Compressing N-Dimensional Data", U.S. Appl. No. 11/559,786, 31 pages, 3 pages of drawings, filed Nov. 14, 2006.

\* cited by examiner

SYSTEM AND METHOD FOR ACTIVE DATA COLLECTION IN A NETWORK SECURITY SYSTEM

TECHNICAL FIELD OF THE INVENTION

This invention relates to intrusion detection systems and, more specifically, to a system for active data collection in a network security system.

BACKGROUND OF THE INVENTION

Intrusion detection systems are used by an enterprise to detect and identify unauthorized or unwanted use (commonly called an attack) of the enterprise's computer network, which normally comprises a large number of nodes and network operations centers. In general, these enterprise intrusion detection systems receive data using sensors or other intrusion detection devices. The system then scans the incoming data for specific patterns in network traffic, audit trails, and other data sources to detect malicious activity. The data that is received in the input stream is passively gathered. In other words, traditional intrusion detection systems are reactive in the sense that they wait for data to be sent to it before performing any sort of correlation or other data processing. As a result, certain additional data that may be useful in detecting malicious activity may not be considered by the system.

SUMMARY OF THE INVENTION

In accordance with the present invention, the disadvantages and problems associated with traditional enterprise intrusion detection systems have been substantially reduced or eliminated.

In one embodiment of the present invention, a network security system comprises a plurality of sensors, a management server, and a data collection module. The plurality of sensors receive first data associated with potential attacks on the system. The management server is coupled to at least one sensor and correlates at least a portion of the first data to detect potential attacks on the system. The data collection module is coupled to the manager server and generates at least one request for second data based upon at least one of the first data and the correlated data. The data collection module communicates the request to at least one source different from the plurality of sensors.

In another embodiment of the present invention, a method for providing network security comprises receiving first data at a sensor, the first data associated with potential attacks on the system. The method continues by correlating at least a portion of the first data to detect potential attacks on the system. The method continues by generating at least one request for second data based upon at least one of the first data and the correlated data. The method concludes by communicating the request to at least one source different from the sensor.

The invention has several important technical advantages. Various embodiments of the invention may have none, some, or all of these advantages. One advantage of the present invention is that it performs active data collection and correlation using a data collection module and data sources. By using active data collection techniques, the system considers specific data that is useful in detecting malicious activity but that was not received by sensors in the normal course of operation. As a result, the system can perform enhanced correlations of data that may not otherwise have been performed. The system is therefore better equipped to detect and resolve attacks on the enterprise.

The data collection module is disconnected from the normal event flow and the correlated event flow. As a result, the active data collection activities of the system do not impair the normal processing of data by sensors, manager servers, or global manager servers.

Other technical advantages of the present invention will be readily apparent to one skilled in the art from the description and the appended claims.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF EXAMPLE EMBODIMENTS OF THE INVENTION

Figure 1:
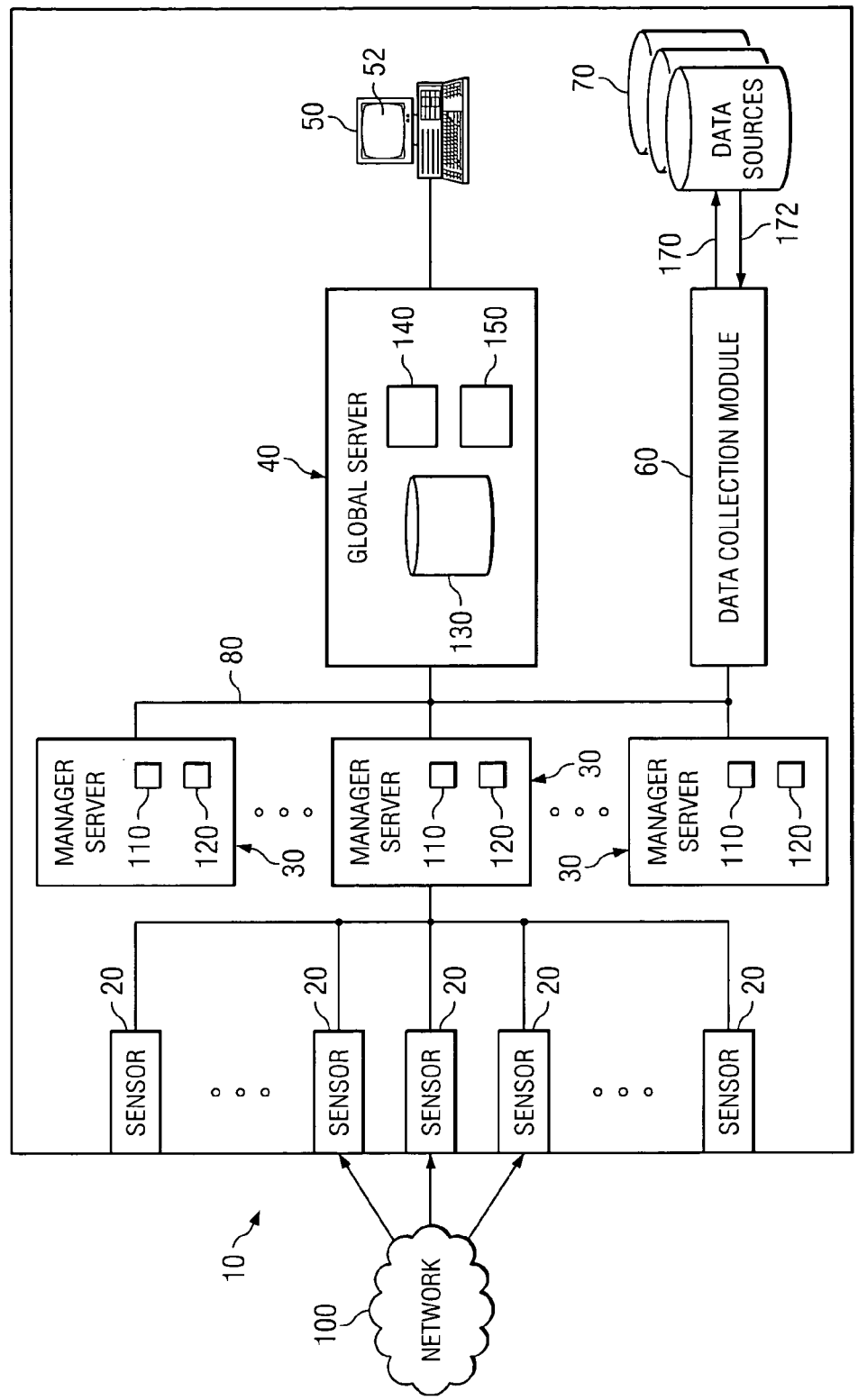
FIG. 1 illustrates an intrusion detection system according to one embodiment of the present invention.

FIG. 1 illustrates an intrusion detection system 10 distributed across an enterprise system according to one embodiment of the present invention. Intrusion detection system 10 comprises a plurality of sensors 20, one or more manager servers 30, global server 40, and console 50. System 10 also comprises data collection module 60 and data sources 70. These elements of system 10 may be communicatively coupled using an internal network 80. In general, system 10 performs active data collection and correlation using data collection module 60 and data sources 70. By using active data collection techniques, system 10 considers specific data that is useful in detecting malicious activity but that was not received by sensors 20 in the normal course of operation. As a result, system 10 can perform enhanced correlations of data that may not otherwise have been performed. System 10 is therefore better equipped to detect and resolve attacks on the enterprise. The additional data can be actively requested from public or private data sources 70 that are external and/or internal to system 10.

The "enterprise" may comprise any business, government, organization, or other entity that has multiple network channels or ports to a network 100. Network 100 may include any suitable portions of an external network and/or an internal network. In addition, the business enterprise may further include links to portions of an internal network. In this regard, intrusion detection system 10 monitors network communications on internal links as well. For example, a business enterprise may include three ports for external network communications including email, internet, and dialup. In this example, intrusion detection system 10 monitors network communications on the three external ports. Based upon data received in these input streams and data actively collected by module 60, system 10 attempts to detect, locate, or block an attack on the business. An "attack" may be any malicious, destructive, or suspicious activity communicated from a source external and/ or internal to the portion of the enterprise protected by system 10. Attacks may include viruses, Trojan horses, worms, or any other piece of code or data that represents at least a portion of an unwanted attempt to access the protected portion of the enterprise.

Internal network 80 may include one or more intranets, local area networks (LANs), metropolitan area networks (MANs), wide area networks (WANs), or any other suitable enterprise network. Network 80 may, for example, communicate Internet Protocol (IP) packets, frame relay frames, Asynchronous Transfer Mode (ATM) cells, and/or other suitable messages between network addresses. According to particular embodiments, messages between the levels may be in one or more formats including Intrusion Detection Message Exchange Format (IDMEF), binary format, and/or any other appropriate format.

Network 100 represents any network not protected by intrusion detection system 10. Accordingly, network 100 communicably couples system 10 with other computer systems. Network 100 may, for example, communicate Internet Protocol (EP) packets, frame relay frames, Asynchronous Transfer Mode (ATM) cells, and/or other suitable information between network addresses. Network 100 may include one or more intranets, local area networks (LANs), metropolitan area networks (MANs), wide area networks (WANs), all or a portion of the Internet, and/or any other communication system or systems at one or more locations. An external client system (not shown) may be any computer, enterprise or non-enterprise, which is trying to access the portion of internal network 80 protected by intrusion detection system 10. As used in this document, the term "computer" is intended to encompass a personal computer, server, mainframe, terminal, workstation, network computer, kiosk, wireless data port, wireless telephone, personal digital assistant (PDA), one or more processors within these or other devices, or any other suitable processing device.

Each sensor 20 is located at a network port that receives TCP/IP packets or other similar network communications from network 100. Generally, sensor 20 processes the raw data to detect the presence of an attack and outputs at least the raw data and, when appropriate, a corresponding alert message. In certain embodiments, sensor 20 may also generate messages, such as a packet flow, based on the raw data received from network 100. All of the communications between one or more sensors 20 and one or more manager servers 30 may be referred to as an event flow.

Sensor 20 may use any suitable detection technique to process incoming data and output the appropriate messages. For example, sensor 20 may use algorithms, signatures, scripts, or any suitable detection or comparison technique to process packet headers, packet payloads, and/or any other incoming data. Sensor 20 could include any suitable combination of hardware, software, or firmware to receive data from sources via network 100, process the raw network data, and communicate results to higher levels. For example, sensor 20 may comprise a computer, server, lower-level intrusion detection system, firewall, or any module written in any appropriate computer language such as, for example, C, C++, Java, Perl, and others. It will be understood that while sensor 20 is illustrated as a single multi-tasked module, the features and functionality performed by this engine may be performed by multiple modules such as for example, a sensor module and a packet flow generation module. Additionally, to help ensure that each port is properly monitored, each sensor 20 may be associated with a redundant slave sensor which is operable to assume substantially all of the functionality of the sensor 20 in the event of any failure of sensor 20.

Manager server 30 represents any hardware or software module that controls or monitors one or more servant nodes, such as a sensor 20. In one example, each manager server 30 includes a correlation engine 110 and a correlation ruleset 120 for receiving and correlating data from sensors 20 and/or data collection module 60. Generally, through correlating and aggregating lower-level communications, manager server 30 is capable of detecting an attack occurring within the enterprise and dynamically responding to such a threat.

According to certain embodiments, manager server 30 comprises a general-purpose personal computer (PC), a Macintosh, a workstation, a Unix-based computer, a server computer, or any other suitable processing device. Additionally, to make system 10 more robust, each manager server 30 may be associated with a redundant manager server which is operable to assume substantially all of the functionality of manager server 30 in the event of a failure of the associated manager server 30. Although FIG. 1 provides one example of a server 30 that may be used with the invention, system 10 can be implemented using computers other than servers, as well as a server pool. Manager server 30 may include any hardware, software, firmware, or combination thereof operable to receive communications from lower levels, appropriately process the communications, and dynamically respond.

Global server 40 may comprise a general-purpose personal computer (PC), a workstation, a Unix-based computer, a server computer, or any other suitable processing device. Although FIG. 1 provides one example of global server 40 that may be used with the invention, system 10 can be implemented using computers other than servers, as well as a server pool. Global server 40 may include any hardware, software, firmware, or combination thereof operable to process, control, and monitor system 10 at the highest logical level.

Global server 40 may include an archive database 130 to store the raw archival data collected from various nodes of system 10 for later processing, retrieval, or searches. Archive database 130 may include any memory or database module and may take the form of volatile or non-volatile memory comprising, without limitation, magnetic media, optical media, random access memory (RAM), read-only memory (ROM), removable media, or any other suitable local or remote memory component. In one embodiment, archive database 130 comprises stored IP information such as, for example, TCPDump data corresponding to each packet flow. Archive database 130 may include any other data such as, for example, historical operator commands or response messages previously communicated to lower nodes. Global server 40 may include a global correlation engine 140 that is further operable to process information in archive database 130 to detect the presence of a substantially long-term or multi-staged attack that had previously gone undetected by sensors 20 and manager servers 30. Although FIG. 1 illustrates archive database 130 as residing internally to global server 40, archive database 130 may reside externally or at any other location or locations accessible by global server 40 or other components of system 10.

Global server 40 may further comprise a filtering ruleset 150. Filtering ruleset 150 allows system 10 to reduce the analyst's workload through filtering the information communicated to console 50. Ruleset 150 comprises instructions, algorithms, or any other directive which largely controls the information communicated to console 50. Although FIG. 1 illustrates filtering ruleset 150 as residing internally to global server 40, filtering ruleset 150 may reside externally at one or more manager servers 30 or at console 50 without departing from the scope of this disclosure.

Console 50 may represent any computer that may comprise input devices, output devices, mass storage media, processors, memory, or other components for receiving, processing, storing, and/or communicating information. Intrusion detection system 10 may communicate the intrusion information, such as correlated and/or filtered data, to console 50 so that a user, such as a supervisor or administrator, may view and process the intrusion information. It will be understood that there may be any number of consoles 50 used in system 10 such as, for example, one or more operator or analyst consoles 50 and a supervisor console 50. Console 50 may include a graphical user interface (GUI) 52 that tailors and filters the data presented to the user. Generally, GUI 52 provides the user of console 50 with an efficient and user-friendly presentation of data and events occurring in system 10.

Data collection module 60 comprises any suitable combination of hardware and software to perform active data collection and correlation techniques. Data collection module 60 requests and receives information from data sources 70 using one or more requests 170. The information is returned in the form of one or more responses 172. Each request 170 may be based upon a kernel of information already received within system 10, such as, for example, data associated with one or more attack events on system 10, data correlated by servers 30 and/or 40, or even one or more responses 172. Data sources 70 comprise sources of data that are either internal or external to system 10. For example, a data source 70 may comprise a geographic location server that translates between IP addresses and geographic locations. A data source 70 may also comprise an internet directory server, such as a Domain Name System (DNS) server, that translates between domain names and IP addresses. A data source 70 may also comprise a security vulnerability device, such as a scanner (e.g., Nessus), a server, or a database. Such a device may be used to launch covert gathering agents directly at an attacker.

Figure 2:
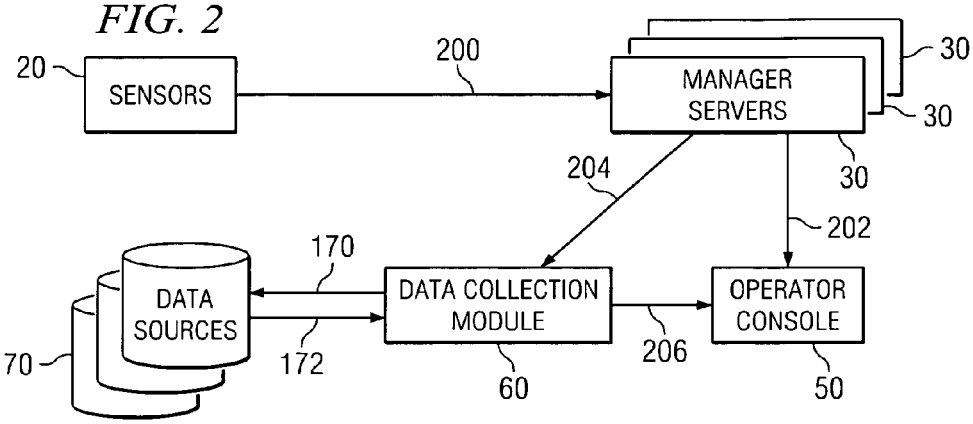
FIG. 2 illustrates a flow of operation among various components of the system illustrated in FIG. 1.

FIG. 2 illustrates an example operation of system 10. In particular, sensors 20 communicate data to manager servers 30 in an event flow 200. Event flow 200 represents information about possible attacks such as raw data, alert messages and/or logs that are passively received in the normal course of operation. Correlation engine 110 of one or more manager servers 30 correlates the information communicated in the event flow 200 according to a correlation ruleset 120 and communicates a correlated event flow 202 to operator console 50, such as via global server 40. This sort of correlation therefore depends on and is limited to information provided to manager servers 30 by an event input stream that is passively received by sensors 20. From time to time, it may be advantageous to collect and correlate additional information about a particular event in order to determine potential malicious activity. For example, it may be useful to discover the geographical location of an attack in order to determine whether it is related to another attack. Or, it may be useful to determine if a particular attacker is using a particular operating system to better understand the nature of the attack and the attacker. In these instances, manager servers 30 may launch a data collection session by communicating a query 204 to data collection module 60. The query 204 may include a kernel of information that may be used by data collection module 60 to generate an information request 170. Characteristics from the kernel of information are used to request more information from data sources 70. Data collection module 60 is disconnected from the normal event flow 200 and the correlated event flow 202. As a result, the data collection activities of module 60 do not impair the normal processing of data by sensors 20, and servers 30 and 40.

The kernel of information used to request more information from data sources 70 may be a piece of raw data received by a manager server 30, such as, for example, the source IP address of an attacker; the time of day of a particular attack; or the port on which a sensor 20 received the raw data. The kernel of information may also be the result of a correlation of data performed by a server 30, such as, for example, the common source IP address of a series of attacks; the range of times of a series of attacks; or the common port on which a series of attacks were initiated.

An example is used to illustrate the process of generating requests 170 and receiving responses 172. It is generally difficult to correlate attacks made from open wireless networks. Users may connect to open wireless networks from the safety of a roadside vehicle and attack or probe a remote site. After attacking, they can simply drive to another open network and attack with a different tool or probe to that network to gain more information about it. The explosion of WI-FI technology in home and office use makes it relatively easy to find and penetrate these networks as "free" connections to the internet. This attack method allows the attacker to gather data on a remote network very quickly in seemingly disconnected intrusion attempts. Since the attacks come from different network addresses and many times from different service providers at different times, there is no clear correlation to tie them together other than geographic location.

After receiving one of these attacks, manager server 30 may send a query 204 to data collection module 60 to collect and correlate additional information about one or more of the attacks. For example, data collection module 60 may try to discover the geographical location of the attacks. A "trace route" to the attacking FP address and a DNS query on the attacking IP address may result in the determination that the attack came from Malibu, Calif., or nearby. In particular, data collection module 60 may generate a request 170 of a geographic location server using one or more known IP addresses in order to determine the geographic location of the attack. The geographic location server may indicate the geographic location information as one or more responses 172 to data collection module 60. Another request 170 may be initiated to determine whether other attacks have been made in this area in the last several days. No results may be found.

In an hour, another attack may be detected and another query 204 may be sent to the data collection module 60. The geographic location of this attack may also be determined to be Malibu, Calif., even though the service provider and the IP address are in every other way unrelated to the first attempt. This time, when another request 170 is made to identify other attacks from this geographical area, the first attack is found, and the two are correlated by data collection module 60. This additional correlation information 206 is communicated to console 50, such as in the form of a relationship score. This relationship score indicates the likelihood that the two attacks are related, based on previous experiences or possibly through the use of a Bayesian network weight.

In time, as the attacker uses different networks and attacks, these attacks are added to the group of attacks from Malibu, Calif. Data collection module 60 may correlate information regarding each of these attacks. When a threshold number of such attacks has been identified, this information may also be brought to the attention of the operator in the form of correlation information 206, and the intrusion attempts are plotted on a map with times of attack noted. The operator at console 50 may recognize a pattern and contact local authorities in Malibu, Calif. with information that could lead to the arrest and conviction of the attacker.

Although in this case, the geographical location is the information that is actively gathered, there are several other types of information that could be requested by data collection module 60. For instance, a vulnerability scan of the attacking machine can reveal a vulnerability signature that can be correlated with other data or used to "hack back" the attacking machine. Logs requested from SQL, WEB, MAIL, and firewall servers could give an indication of other activities the attacker has been involved in. It may be that the volume of these logs is too large to be included during normal operation but can be requested under special circumstances. In the case that the attacker is directly connected to the network being attacked (for instance in the case of an "insider" attack), exhaustive information and packet logs can be requested of the switch connecting that user to the network. The number of items of data that can be requested or obtained are significant.

After responses 172 are received, data collection module 60 may perform correlation with other events, such as events stored in one or more archive databases 130, that may not up to that point have been associated with the original event. For example, after requesting DNS records from a DNS server, it may be determined that event A and event B are from source IP addresses under the same administrative control of a single company. They may be loosely or tightly associated as a result of this new information. In addition, this connection may prompt further information gathering (e.g., for instance an exhaustive list of IP addresses under the same administrative control). On the other hand, additional information may serve to weaken previous correlative work. For example, since two attacks occurred together in time it would suggest that they may be related. However, upon doing a vulnerability scan of the machines, it may become clear that one is being controlled through a well known "drone" program while the other is an attack through a dialup network commonly used for attacks, and no evidence of a similar "drone" program exists.

By actively requesting this information and considering it in further correlation, data collection module 60 increases considerably the number of attacks found and the amount of understanding of the current state of the network being monitored.

Figure 3:
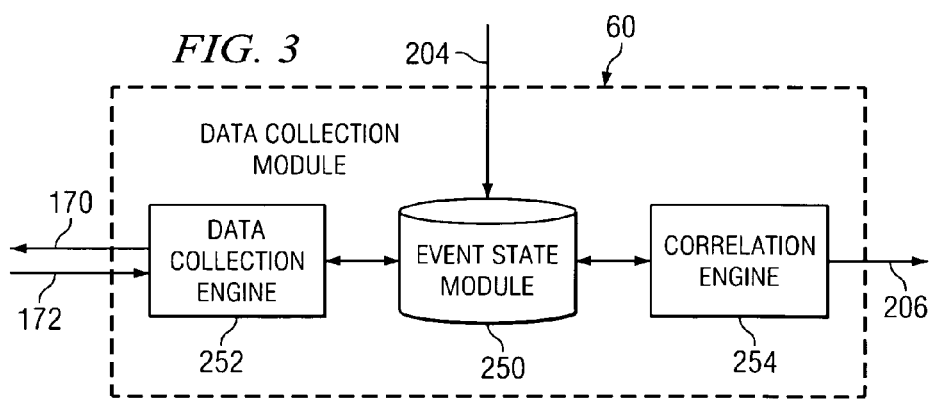
FIG. 3 illustrates one embodiment of a data collection module of the system illustrated in FIG. 1.

FIG. 3 illustrates an example embodiment of data collection module 60 that includes event state module 250, data collection engine 252, and correlation engine 254. Event state module 250, data collection engine 252, and correlation engine 252 comprise any suitable combination of hardware, software, and firmware to perform the described functionality. Although these elements of data collection module 60 are illustrated as separate components, it should be understood that one or more of these elements may be integrated with other elements of data collection module 60 or with other elements of system 10, such as sensors 20, manager servers 30, or global manager servers 40.

In general, event state module 250 is responsible for maintaining state information for events that are the subject of queries 204. Examples of state information maintained by event state module 250 include additional data that has been requested by data collection engine 252; additional data that has been received in response to a request 170; additional data that is yet to be requested; and correlated data. Data collection engine 252 is responsible for performing the active data collection process, including communicating requests 170 and receiving responses 172. Data collection engine 252 may initiate several data collection processes in response to one or more queries 204, or in response to one or more previous responses 172. Event state module 250 maintains state information to keep track of the various data collection processes that have been or will be initiated and/or completed. Correlation engine 254 is responsible for correlating the additional data received in a response 172 with other data, such as data stored in archive database 130, data stored in event state module 250, other data correlated by correlation engine 254, other data correlated by other correlation engines 110, or any other data within system 10.

In operation, when information about a new event or a group of events is received, in conjunction with a query 204, it is recorded in the event state module 250. Module 250 keeps track of the state of all of the current events for which additional information is being gathered. After the state information is recorded, an appropriate data collection process is invoked by data collection engine 252. For example, a DNS query process may be invoked in order to generate an appropriate request 170 from a DNS server data source 70. The DNS query process would be responsible for obtaining the information and returning that information to the state module 250 so that the new state can be computed. It may be that the information cannot be obtained or that the data collection engine 252 fails to report back. In this case, an automated timer can be implemented to recalculate a state of old requests 170 and decide what to do. For example, after a timeout, a previous request 170 may be reissued a predetermined number of times. Alternatively, or in addition, the previous request 170 may be discarded after a certain number of attempts have failed.

Data collection engine 252 may receive responses 172 that may be communicated to event state module 250. When the state information is updated with the new information gathered, the information is handed to the correlation engine 254 which operates similarly to the correlation engine 110 of manager service 30. Correlation engine 254 correlates data collected by data collection engine 252 with other data collected by engine 252, data received by sensors 20, or with the results of other data correlation to produce results. If a good decision can be made, the new correlated data 206 is sent to the appropriate console 50. On the other hand, additional information may yet be required, in which case the incident would be again given to the event state module 250 and additional information requested by data collection engine 252.

Another example may be used to illustrate the operation of data collection module 60. System 10 receives many attacks upon a specific host from a variety of sources. A query 204 is sent to the data collection module 60 to try to find a correlation between these attacks. The correlation engine 254 of the data collection module 60 first tries to determine if the geographic source of the attacks is similar. If this fails, the correlation engine 254 tries to determine if the DNS administrative contact is the same. If this fails, the correlation engine 254 queries the event history for time correlation between each pair of source IP addresses to see if they have acted in concert before. This type of querying can involve one or more requests 170 and responses 172 to collect additional information from data sources 70 that may be useful to correlation engine 254. The querying can go on until some type of correlation between the attacks is found. In that case, an appropriate action can be taken. Alternatively, the querying may go on for a period of time without leading to any correlation, at which point it may be terminated. In either case, the querying may be recorded in the event state module 250.

In another example, system 10 receives an attack from a host. The data collection module 60 determines using a local lookup that this host has previously had a "counter agent" installed on it by system 10 to monitor activity. An information request 170 is put into the queue for a list of recent network connections on that host. When the host reports in, as it does periodically, that information is given to the event state module 250. Each entry in the list is correlated with previous attackers by correlation engine 254, and it is found that more than two hosts that have attacked system 10 have had connection to this third IP address. An incident that tracks these together is created to gather evidence of this third party using intermediate machines to attack system 10. A scan is sent to the "real" attacker and its vulnerability is assessed. Appropriate action, such as a counter attack or communicating with an internet service provider can now be taken.

Therefore, there are a great variety of times when by requesting additional information, much smarter decisions of what to do can be made by correlation engines within system 10. Data collection module 60 may be used to enable this type of active information gathering.

Although the present invention has been described in detail, it should be understood that various changes, substitutions and alterations can be made hereto without departing from the scope of the invention as defined by the appended claims.

What is claimed is:

1. A network security system, comprising:
   a plurality of sensors operable to receive first data associated with potential attacks on a network security system;
   a manager server coupled to at least one of the plurality of sensors and comprising a first processor, the manager server operable to:
      correlate at least a portion of the first data based on a correlation rule set to detect potential attacks on the system; and
      communicate a query comprising the first data and the correlated data, the correlated data being based at least in part on the correlation of at least a portion of the first data; and
   a data collection module coupled to the manager server and an archive database, the data collection module comprising a second processor, the data collection module operable to:
      receive the query from the manager server;
      generate at least one request for second data based upon the received query;
      communicate the at least one request to at least one source different from the plurality of sensors, wherein the at least one source is a server that translates IP addresses;
      correlate second data received from the server that translates IP addresses with at least a portion of the first data received by the plurality of sensors; and
      generate a relationship score indicating a likelihood that the first data is related to a previous potential attack based on the correlated second data and event history in the archive database;
   the first data associated with potential attacks on the network security system being communicated from the plurality of sensors to the manager server without passing through the data collection module.

2. The system of claim 1, wherein the at least one source is external to the network security system.

3. The system of claim 1, wherein the at least one source is internal to the network security system.

4. The system of claim 1, wherein the data collection module correlates at least a portion of the second data with the correlated portion of the first data.

5. The system of claim 1, wherein the data collection module receives the second data in response to the at least one request and, in response, generates another request to at least one source different from the plurality of sensors.

6. The system of claim 1, wherein the first data is passively gathered and the second data is actively requested.

7. The system of claim 1, wherein the data collection module is integrated with at least one sensor or manager server.

8. The system of claim 1, wherein the at least one source comprises:
   a geographic location server that translates between IP addresses and geographic locations.

9. The system of claim 1, wherein the at least one source comprises an internet directory server that translates between domain names and IP addresses.

10. The system of claim 1, wherein the data collection module is further operable to communicate the at least one request to a security vulnerability device.

11. A method for providing network security, comprising:
   receiving first data at a sensor, the first data associated with potential attacks on a network security system;
   correlating by a manager server at least a portion of the first data to detect potential attacks on the system based on a correlation rule set;
   communicating by the manager server a query comprising the first data and the correlated data, the correlated data being based at least in part on the correlation of at least a portion of the first data;
   receiving the query from the manager server at a data collection module;
   generating by the data collection module at least one request for second data based upon the received query;
   communicating by the data collection module the at least one request to at least one source different from the sensor, wherein the at least one source is a server that translates IP addresses;
   correlating the second data received from the server that translates IP addresses with at least a portion of the first data received by the plurality of sensors; and
   generating a relationship score indicating a likelihood that the first data is related to a previous potential attack based on the correlated second data and event history in the archive database;
   the first data associated with potential attacks on the network security system being communicated from the sensor to the manager server without passing through the data collection module.

12. The method of claim 11, further comprising correlating at least a portion of the second data with the correlated portion of the first data.

13. The method of claim 11, further comprising:
   receiving the second data in response to the at least one request; and
   in response to receiving the second data, generating another request to at least one source different from the sensor.

14. The method of claim 11, wherein the first data is passively gathered and the second data is actively requested.

15. The method of claim 11, wherein the at least one source comprises one of:
   a geographic location server that translates between IP addresses and geographic locations; and
   an internet directory server that translates between domain names and IP addresses.

16. A data collection module for use in a network security system, the data collection module comprising:
   one or more processors;
   a state module operable to:
      receive a query from a manager server, the query comprising a first data associated with potential attacks on a network security system received at a sensor and correlated data, the correlated data generated by the manager server from at least a portion of the first data based on a correlation rule set in order to detect potential attacks on the system; and maintain state information for a plurality of events, wherein at least one event is associated with potential attacks on a network security system;

a data collection engine coupled to the state module and an archive database, the data collection module, for at least one event, operable to:

communicate a request for data to a data source that translates IP addresses; and receive data from the data source that translates IP addresses in response to the request; and a correlation engine operable to correlate the received data from the data source that translates IP addresses with the state information to detect potential attacks on the system, and generate a relationship score indicating a likelihood that the first data is related to a previous potential attack based on the correlated received data and event history in the archive database;

the first data associated with potential attacks on the network security system being communicated from the sensor to the manager server without passing through the data collection module.

17. The data collection module of claim 16, wherein:
at least one event is associated with data received from a sensor; and
the data source is different from the sensor.

18. The data collection module of claim 16, wherein the data collection engine generates another request for data based at least in part upon the received data.

19. The data collection module of claim 16, wherein the state information is associated with at least one of the following for each event:
data that has been requested;
data that has been received in response to a request;
data that is yet to be requested; and
correlated data.

20. The data collection module of claim 16, wherein the data source comprises one of:
a geographic location server that translates between IP addresses and geographic locations; and
an internet directory server that translates between domain names and IP addresses.

* * * * *